United States Patent [19]

Keoshkerian et al.

[11] Patent Number: 6,075,105

[45] Date of Patent: Jun. 13, 2000

[54] POLYMERIZATION PROCESSES AND RESIN PARTICLES FORMED THEREBY

[75] Inventors: Barkev Keoshkerian, Thornhill; Michael K. Georges, Guelph; Peter M. Kazmaier; Gordon K. Hamer, both of Mississauga, all of Canada

[73] Assignee: Xerox Corporation, Stamford, Conn.

[21] Appl. No.: 08/703,266

[22] Filed: Aug. 26, 1996

[51] Int. Cl.[7] ............................................. C08F 2/38
[52] U.S. Cl. ...................... 526/220; 526/204; 526/217; 526/319; 526/323.1; 526/336; 526/340; 526/347; 526/909
[58] Field of Search ........................ 526/204, 217, 526/220, 336

[56] References Cited

U.S. PATENT DOCUMENTS

| | | | |
|---|---|---|---|
| 4,728,695 | 3/1988 | Brouwer et al. | 525/291 |
| 4,849,318 | 7/1989 | Tsubota | 430/137 |
| 5,104,764 | 4/1992 | Wada | 430/109 |
| 5,322,912 | 6/1994 | Georges | 526/204 |
| 5,384,224 | 1/1995 | Tanikawa | 430/106 |
| 5,447,813 | 9/1995 | Hagiwara | 430/106.6 |

FOREIGN PATENT DOCUMENTS

| | | |
|---|---|---|
| 0 135 280 | 3/1995 | European Pat. Off. . |
| 478838 | 3/1976 | U.S.S.R. . |
| WO 94 11412 | 5/1994 | WIPO . |

OTHER PUBLICATIONS

A.V. Trubnikov et al.; "Effect of Stable Radicals on Styrene Polymerization"; Sarator N.G. Chernyshersky University, Jul. 2, 1974 (submitted).

High Molecular Compounds, vol. (A)XX, No. 11; 1978; A.V. Trubnikov et al.; "Inhibition of Polymerization of Vinyl Monomers Using Nitride and Iminoxide Radicals."

M.D. Goldfein et al., "Inhibition of Styrene Polymerization by Stable Radicals 4,4'–diethoxydiphenylnitroxide," Sarator N.G. Chernyshevsky State University, Submitted Jun. 27, 1972.

M.D. Goldfein et al., "Effect of Free Stable Radicals on the Kinetics and Mechanism of Polymerization of Certain Vinyl Monomers"; Saratov N.G. Chercyshersky State University, Submitted Jan. 1, 1974.

A.V. Trubnikov et al.; "Mechanism of Inhibition of Polymerization of Vinyl Monomers by Stable Radicals;" Saratov N.G. Chernyshersky State University, Submitted Jul. 7, 1975.

*Primary Examiner*—Fred Zitomer
*Attorney, Agent, or Firm*—John L. Haack

[57] ABSTRACT

A process for the preparation of resin particles comprising: heating a mixture comprised of a free radical initiator compound, at least one stable free radical compound, at least one free radical polymerizable monomer compound, and at least one free radical polymerizable crosslinking compound; and cooling the mixture, wherein the resulting product resin particles are crosslinked and are comprised of polymerized monomers and at least one crosslinking compound, and wherein the particles have a narrow particle size distribution, a narrow pore size distribution, and a high monomer to polymer conversion.

19 Claims, No Drawings

POLYMERIZATION PROCESSES AND RESIN PARTICLES FORMED THEREBY

REFERENCE TO COPENDING AND ISSUED PATENTS

Attention is directed to commonly owned and assigned U.S. Pat. No. 5,322,912, issued Jun. 21, 1994, entitled "POLYMERIZATION PROCESSES AND THEIR TONER COMPOSITIONS THEREFROM", wherein there is disclosed free radical polymerization processes for the preparation of a thermoplastic resin or resins comprising: heating from about 100° C. to about 160° C. a mixture comprised of a free radical initiator, a stable free radical agent, and at least one polymerizable monomer compound to form the thermoplastic resin or resins with a high monomer to polymer conversion and a narrow polydispersity; U.S. Pat. No. 5,412,047, issued May 2, 1995, entitled "HOMOPOLYMERIZATION PROCESSES WITH OXONITROXIDES", wherein there is illustrated stable free radical moderated polymerization processes which employ an oxo nitroxide compound which enable the controlled homopolymerization of acrylate and related monomer compounds; U.S. Pat. No. 5,401,804, issued Mar. 28, 1995, which is a divisional application of U.S. Pat. No. 5,322,912, entitled "POLYMERIZATION PROCESS AND TONER COMPOSITIONS THEREFROM"; U.S. Pat. No. 5,449,724, issued Sep. 12, 1995, entitled "Stable Free Radical Polymerization Process and Thermoplastic Materials Produced Therefrom", which discloses high pressure stable free radical polymerization processes for preparing, for example, polyethylene rubbers; U.S. Pat. No. 5,312,704, issued May 17, 1994, entitled "MONOMODAL, MONODISPERSED TONER COMPOSITIONS AND IMAGING PROCESSES", wherein there is illustrated a toner composition comprised of pigment particles, and a resin prepared by anionic means comprised of a monomodal polymer resin or monomodal polymer resin blends and wherein the monomodal resin or resin blends possess a narrow polydispersity; U.S. Pat. No. 5,498,679, issued Mar. 12, 1996, entitled "PROCESS FOR PRODUCING TELECHELIC, BRANCHED AND STAR THERMOPLASTIC RESIN POLYMERS", wherein there is disclosed a free radical polymerization process for the preparation of a thermoplastic resin or resins, comprising: heating a mixture of a multifunctional nitroxide compound and at least one polymerizable monomer compound to form the thermoplastic resin or resins; cooling the mixture; optionally isolating the thermoplastic resin; and optionally washing and drying the thermoplastic resin; wherein the multifunctional nitroxide compound is formed from a stable free radical agent and a compound having one or more halide functional groups, and wherein the free radical polymerization process may be used to prepare telechelic, branched and star polymers; and U.S. Pat. No. 5,530,079, issued Jun. 25, 1996, entitled "POLYMERIZATION PROCESSES", wherein there is disclosed a free radical polymerization process for the preparation of a thermoplastic resin or resins, comprising: heating a mixture of a non nitroxide stable free radical agent, a free radical initiator compound and a polymerizable monomer compound to form the thermoplastic resin or resins.

Attention is directed to commonly owned and assigned copending applications Application Numbers, U.S. Ser. No. 08/363,083 (D/92579DD) filed Dec. 23, 1994, now U.S. Pat. No. 5,549,998, a divisional application of U.S. Pat. Nos. 5,322,912 and 5,401,804, entitled "POLYMERIZATION PROCESSES AND TONER COMPOSITIONS THEREFROM"; U.S. Ser. No. 08/037,192, now U.S. Pat. No. 5,852,140 (D/92581), filed Mar. 25, 1993, entitled "SEMISUSPENSION POLYMERIZATION PROCESSES"; U.S. Ser. No. 08/214,518 (D/925791), filed Mar. 18, 1994, entitled "EMULSION POLYMERIZATION PROCESSES AND TONER COMPOSITIONS THEREFROM", a continuation-in-part of U.S. Ser. No. 07/976,604, filed Nov. 16, 1992 U.S. Pat. No. 5,322,912; U.S. Ser. No. 08/223,418 (D/93729), filed Apr. 4, 1994, entitled "AQUEOUS POLYMERIZATION PROCESSES"; U.S. Ser. No. 08/292,670 (D/94133), filed Aug. 18, 1994, entitled "BIFUNCTIONAL MACROMOLECULES AND TONER COMPOSITIONS THEREFROM"; U.S. Ser. No. 08/317,044 (D/94150), filed Oct. 3, 1994, U.S. Pat. No. 5,545,504 entitled "INK JETTABLE TONER COMPOSITIONS AND PROCESSES FOR MAKING AND USING"; U.S. Ser. No. 08/345,371 (D/94743), filed Nov. 18, 1994, entitled "POLYMERIZATION PROCESSES"; U.S. Ser. No. 08/348,022 (D/94772), filed Dec. 1, 1994, entitled "POLYMERIZATION MULTIBLOCK COPOLYMER PROCESS AND COMPOSITIONS THEREOF"; U.S. Ser. No. 08/348021 (D/94635), filed Dec. 12, 1994, entitled "POLYMERIZATION PROCESS AND COMPOSITIONS THEREOF"; U.S. Ser. No. 08/413,663 (D/95113), filed Mar. 30, 1995, U.S. Pat. No. 5,608,023 entitled "RATE ENHANCED POLYMERIZATIONS"; U.S. Ser. No. 08/413,752 (D/95071), filed Mar. 30, 1995, entitled "STABLE FREE RADICAL POLYMERIZATION UNDER SUPERCRITICAL CONDITIONS AND POLYMERS PRODUCED THEREBY"; U.S. Ser. No. 08/413,645 (D/94136), filed Mar. 30, 1995, U.S. Pat. No. 5,773,510 entitled "PROCESSES FOR THE PREPARATION OF BRANCHED POLYMERS"; U.S. Ser. No. 08/553,200 (D/95421), filed Nov. 7, 1995, U.S. Pat. No. 5,739,229 entitled "POLYMERIZATION PROCESSES"; U.S. Ser. No. 08/558,996 (D/95332), filed Nov. 10, 1995, U.S. Pat. No. 5,552,502 entitled "POLYMERIZATION PROCESSES"; FOR PREPARING TELECHELIC, BRANCHED AND STAR THERMOPLASTIC RESIN POLYMER"; U.S. Ser. No. 08/620,728 (D/93728D) filed Mar. 25, 1996, U.S. Pat. No. 5,610,250 entitled "POLYMERIZATION PROCESSES", a divisional application of the aforementioned U.S. Pat. No. 5,530,079; and U.S. Ser. No. 08/700,328, now U.S. Pat. No. 5,728,742 entitled "STABLE FREE RADICAL POLYMERIZATION PROCESSES AND COMPOSITIONS THEREOF".

The disclosures of each the above mentioned patents and copending applications are incorporated herein by reference in their entirety.

BACKGROUND OF THE INVENTION

The present invention is generally directed to processes for the preparation of crosslinked thermoplastic or thermoset resin particles. More specifically, the present invention relates to improved polymerization processes which provide crosslinked homopolymer and copolymer resin particle products which have a substantially uniform polymer chain length or primary structure and which polymerization processes proceed with high monomer to polymer conversion. In particular, this invention relates to stable free radical mediated, pseudoliving polymerization processes which yield crosslinked homopolymers and copolymers having low, medium or high crosslink density and improved control of particle size properties, and which processes accomplished in accordance with the present invention provide numerous operational and economic advantages.

This invention also relates to crosslinked thermoplastic resin and preparative processes thereof which provide thermoplastic resin particles that are prepared in situ and can incorporate functional groups that are present in the monomers used. More specifically, the present invention relates to crosslinked polymers, particles thereof, and a process for preparing the polymers and particles directly in the same reaction vessel. This invention also relates to a method for preparing toner compositions which forego energy intensive, conventional mechanical crushing and grinding steps in achieving toner sized particles. The process is particularly useful in the production of thermoplastic polymer resins for use in a wide variety of thermoplastic applications.

The present invention provides, in embodiments, a living or pseudoliving polymerization process that enables the synthesis of crosslinked homopolymer and copolymer resins and particles thereof from a variety of free radical reactive monomers. The process, in embodiments, uses known free radical initiators in combination with nitroxide or non-nitroxide type stable free radical agent compounds, free radical reactive crosslinking compounds containing two or more non adjacent double bonds, and a variety of free radical reactive monomers to afford crosslinked thermoplastic resins or elastomers. In other embodiments, the present invention provides processes for preparing crosslinked thermoplastic or thermoset resin particles having available thereto a broad spectrum of, and operator controllable, level of interpolymer chain crosslinking by conducting a stable free radical mediated polymerization in the presence of one or more suitable crosslinking agent compounds at elevated temperatures, wherein monomer is added substantially uniformly to all of the propagating chains, including main chain or primary polymer structure and side chains effected by the polymerization of the crosslinking compound onto or into the main chain and subsequent polymerization of monomers thereon arising, for example, from integration of the crosslinking compound into another propagating polymer chain.

Of the known polymerization processes a preferred way to crosslink polymers or copolymers is by free radical processes. Conventional free radical polymerization processes that are used to polymerize monomers in general, and functionalized monomers in particular, inherently give broad polydispersity resin products or require that sophisticated processing conditions and materials handling protocols be employed. The use and availability of crosslinked resins having controlled particle size and operator selectable particle composition in industrial applications is limited because known free radical polymerization processes are generally difficult to control and produce, for example, insoluble polymer gels, even if the crosslinking is accomplished in a separate post polymerization step. Consequently such crosslinking and polymerization processes are generally limited in their industrial utility. Furthermore, the extent to which various functional groups can be directly incorporated into the crosslinked polymer is limited because of physical limitations imposed on conventional free radical polymerization reactions, for example, the preparation of sulfonated polystyrene cross linked ion-exchange particles.

It is desirable to have stable free radical mediated polymerization processes which provide crosslinked resin particles which overcome the shortcomings and disadvantages of the aforementioned related free radical polymerization processes.

Crosslinked resins can be constructed with a variety of primary, secondary, and tertiary structures and which structural terms are well known in the art of macromolecular chemistry. The crosslinking associated with these systems provide a number of useful properties, reference for example, commonly owned and assigned U.S. Pat. No. 4,894,309, issued Jan. 16, 1990, to Georges et al., which discloses a free radical suspension polymerization process for obtaining crosslinked styrene butadiene ternary copolymers which comprises the polymerization of styrene monomers, butadiene monomers, and crosslinking components in the presence of a surfactant, a stabilizer, and a first and a second initiator; and wherein the aforementioned components are present in an aqueous phase; heating the resulting aqueous mixture at a temperature of from about 50° C. to about 110° C.; thereafter heating the mixture at a temperature of from about 110° C. to about 150° C.; followed by cooling and isolating the desired product. Mixtures of crosslinked and uncrosslinked resins can be blended in such a manner as to achieve beneficial melt mixing and hot melt rheological properties, such as hot offset temperature and minimum fix temperatures, which properties are of considerable importance and utility to liquid and dry toner developer compositions used in xerographic and related marking technologies, reference for example: U.S. Pat. No. 4,457,998, issued Jul. 3, 1984 to Gruber et al., wherein there is disclosed improved developer compositions afforded by resin particles which are comprised of an uncrosslinked polymer incorporated into a polymer network highly crosslinked in the presence of the uncrosslinked polymer, the uncrosslinked polymer being of a different chemical composition than the crosslinked polymer, thereby resulting in the formation of a sponge-like structure; and U.S. Pat. No. 5,057,392, issued Oct. 15, 1991, to McCabe et al., wherein a crystalline crosslinked and amorphous polyesters, a novolac epoxy resin, and a crosslinking catalyst are admixed, melt blended, and annealed at an intermediate glass transition temperature so that the crosslinked polyester recrystallizes as small highly dispersed particles in a matrix phase comprised of the crosslinked reaction product of the amorphous polyester and the novolac epoxy resin. Other approaches to achieving crosslinked polymeric materials with controlled physical and chemical properties include commonly owned U.S. Pat. Nos. 5,227,460, 5,393,630, 5,401,602, 5,407,772, and 5,414,052.

Sulfonated polystyrene-divinylbenzene (PS/DVB) resins have been commercialized for many years and used as, for example, cation exchange resins in many applications such as in water treatment, in recovery of metals from aqueous solutions, in chromatography, as catalysts, and the like applications. However, their applicability has been restricted due to their low thermal stability in water or water-containing media. Above about 150° C. the aromatic sulfonic acid groups are increasingly hydrolyzed. A number of structurally modified resins have appeared directed toward solving the thermal instability problem and which modified resins reduce the premature loss of sulfonic acid groups when the resins are subjected to elevated temperatures for extended periods of time, reference for example, U.S. Pat. No. 4,728,695, issued Mar. 1, 1988, to Brouwer et al., which discloses crosslinked resin compositions comprising sulfoalkylated-carboxy resins having improved thermal stability properties, that is, when the resin is in the acid form, at elevated temperatures in the presence of water or in aqueous media. Sulfonated polystyrene crosslinked with divinylbenzene and related resins prepared by conventional methodologies, such as free radical polymerization of styrene monomers followed by a post polymerization sulfonation, provides up to only about a 15 mole percent sulfonation of the resin. Hence the ion exchange capacity, that is, the sulfonate groups available for ion exchange processes, of these resins is quite limited.

Practitioners in the art have long sought an inexpensive, efficient and environmentally efficacious processes for producing crosslinked polymers having operator controllable or selectable: crosslink density, particle size range, pore size distribution properties and functional group content, and further, general processes which can be easily modified to selectively afford a wide variety of different crosslinked polymer product types which are tolerant of a wide variety of functional groups with the aforementioned properties, crosslink density, particle size, pore size distribution properties and functional group content.

In the aforementioned commonly owned Georges et al., U.S. Pat. No. 5,322,912, there is disclosed free radical polymerization processes for the preparation of a thermoplastic resin or resins comprising: heating from about 100 to about 160° C. a mixture comprised of a free radical initiator, a stable free radical agent, and at least one polymerizable monomer compound to form the thermoplastic resin or resins with a high monomer to polymer conversion and a narrow polydispersity. A broad spectrum of free radical reactive monomers are suitable for use in the highly versatile polymerization process. While a variety of homopolymers and copolymers, including block and multiblock copolymers, could be prepared with high conversions and narrow polydispersities, no mention was made or suggested to include a crosslinking agent in the polymerization process to prepare crosslinked polymer resins and particles thereof with the aforementioned desirable resin and particle properties.

The following documents are of interest.

At least two publications, indicate that random crosslinking does not allow for the formation of narrow pore size distributions, reference for example, T. Bein et al., *J Phys. Chem.*, 90, 4851 (1986) for pore sizes on the order of less than about 2 nanometers, and J. L. Garcia et al., *J. Magn. Magn. Mater,* 363, 140 (1995).

U.S. Pat. No. 4,581,429 to Solomon et al., issued Apr. 8, 1986, discloses a free radical polymerization process which controls the growth of polymer chains to produce short chain or oligomeric homopolymers and copolymers including block and graft copolymers. The process employs an initiator having the formula (in part)=N—O—X, where X is a free radical species capable of polymerizing unsaturated monomers. The molecular weights of the polymer products obtained are generally from about 2,500 to 7,000 having polydispersities generally of about 1.4 to 1.8, at low monomer to polymer conversion. The reactions typically have low conversion rates and use relatively low reaction temperatures of less than about 100° C., and use multiple stages.

European Patent Publication No. 0135280 corresponding to European Patent Application No. EP 84 304,756 is the European Patent Office equivalent of the aforementioned U.S. Pat. No. 4,581,429.

In *Polymer Preprints,* 35 (1), 778 (1994), Matyjaszewski et al., disclose thermal polymerizations of styrene monomers in the presence of stable radicals and inhibitors, but without a free radical initiator present, such as peroxide or azo compounds.

In the *Journal of the American Chemical Society,* 1994, 116, p. 11185–11186, there is disclosed free radical polymerization processes for the preparation of narrow polydispersity polymers, such as polystyrene, and block copolymers, such as poly(styrene-b-acetoxymethyl styrene), using a free radical initiator, such as benzoyl peroxide, a stable free radical compound such as TEMPO, and a monomer, in accordance with the prior teachings of Georges et al., *Macromolecules,* 1993, p. 26, 2987, which prior teaching is based on the aforementioned commonly assigned U.S. Pat. No. 5,322,912.

In U.S. Pat. No. 5,268,437, to Holy, issued Dec. 7, 1993, there is disclosed a high temperature aqueous processes for the polymerization of monoethylenically unsaturated carboxylic monomer to produce low molecular weight, water-soluble polymer products useful as detergent additives, scale inhibitors, dispersants and crystal growth modifiers. Suitable monomers include acrylic acid, methacrylic acid, maleic acid, maleic anhydride, crotonic acid, and itaconic acid. The reactions are run at temperatures ranging from about 130 to 240° C., preferably from about 140 to about 230° C., with polydispersities less than 2.5. The process can be continuous, semicontinuous, or batch.

In U.S. Pat. No. 4,546,160, to Brand et al., issued Oct. 8, 1985, there is disclosed a process to continuously bulk polymerize acrylic monomers to prepare low molecular weight, uniform polymers employing minor amounts of initiator and, optionally solvents, at short residence times and moderate reaction temperatures to provide high yields of a product with polydispersities less than 3, suitable for high solids applications.

U.S. Patent 3,600,169 to Lawton, issued Aug. 17, 1971, discloses an electrostatic light sensitive reproduction sheet employing a composition comprising in an insulating resinous binder an organic stable free radical and a precursor sensitive to light to be converted to transient free radicals that are reactive with the stable free radical and to change the conductance of the sheet so that an electrostatic image can be formed. Also disclosed is an extensive listing of stable free radical compounds.

Other references cited in an international search report for the aforementioned commonly owned U.S. Pat. No. 5,322, 912 are: *J. Am. Chem. Soc.,* 1983, 5706–5708; *Macromol.,* 1987, 1473–1488; *Macromol.,* 1991, 6572–6577; U.S. Pat. No. 4,628,019 to Suematsu et al., issued Aug. 10, 1986; U.S. Pat. No. 3,947,078 to Crystal, issued Aug. 10, 1976; and U.S. Pat. No. 3,965,021 to Clemens et al., issued Jun. 22, 1976. The cited references disclose alternative means, as discussed above, such as anionic, group transfer, and the like, for preparing polymer resins, and in some instances branched or star type polymers, with narrow polydispersity properties, but which alternative means do not provide the convenience and economic advantages of the present invention.

The following references are also of interest: U.S. Pat. Nos. 3,682,875; 3,879,360; 3,954,722; 4,201,848; 4,542, 182; 4,581,429; 4,777,230; 5,059,657; 5,173,551; 5,191, 008; 5,191,009; 5,194,496; 5,216,096; and 5,247,024.

The aforementioned references are incorporated in their entirety by reference herein.

In free radical polymerization reaction processes of the prior art, various significant problems exist, for example difficulties in predicting or controlling both the polydispersity and modality of the polymers produced. These polymerization processes produce polymers with high weight average molecular weights ($M_w$) and low number average molecular weights ($M_n$) resulting in broad polydispersities or broad molecular weight distribution ($M_w/M_n$) and in some instances low conversion. Further, polymerization processes of the prior art, in particular free radical processes, are prone to generating excessive quantities of heat since the polymerization reaction is exothermic. As the viscosity of the reaction medium increases dissipation of heat becomes more difficult. This is referred to as the Trommsdorff effect as discussed and illustrated in "Principles of Polymerization", G.Odian, 2nd Ed., Wiley-lnterscience, N.Y., 1981, page 272, the disclosure of which is entirely incorporated herein by reference. This is particularly the situation for reactions with high concentrations of soluble monomer, for example greater than 30 to 50 percent by weight soluble monomer, which are conducted in large scale reactors with limited surface area and limited heat dissipation capacity. Moreover, the exothermic nature of free radical polymerization processes is often a limitation that severely restricts the concentration of reactants or the reactor size upon scale up.

Further, gel body formation in conventional free radical polymerization processes may result in a broad molecular weight distributions and/or difficulties encountered during filtering, drying and manipulating the product resin, particularly for highly concentrated reactions.

Other disadvantages associated with the prior art methods for preparing crosslinked polymeric materials is that they typically provide products with highly variable crosslink length or interchain separation, and low functional group content, and highly variable or broad pore size distributions in particles formed thereby, and difficult to control particle size properties, for example.

These and other disadvantages are avoided, or minimized with the crosslinking polymerization and particle forming processes of the present invention.

Thus, there remains a need for crosslinking polymerization processes for the preparation of in situ, high functional group content, easily controlled particle sized polymeric resins by economical and scalable free radical polymerization techniques and which polymers retain many or all of their desirable physical properties, for example, low gel content, processibility, clarity, high gloss durability, and the like, while avoiding the problems of non-uniform crosslink length, gel formation, exotherms, volume limited and multistage reaction systems, complex purification, encumbered or compromised performance properties due to undesired residuals, broad polydispersity properties of the polymer resin products, and the like, associated with prior art concurrent free radical polymerization and crosslinking methodologies.

There has been a long felt need for an economical free radical polymerization processes which are suitable for preparing highly functionalized crosslinked type resins in the presence of water or protic solvents.

There also remains a need for polymerization processes which enable the preparation of polymers with high molecular economy and efficiency, and by providing alternative synthetic pathways, such as linear, convergent, and de novo routes, and which compounds and polymerization processes overcome the aforementioned limitations and problems.

There is a need for process methodology to generate stable free radical terminated chain sites which can be used for the purpose of subsequently structurally articulating the terminated site with desirable functional groups and or polymer chain elongation wherein the performance properties of the polymeric product may be enhanced further.

There is also a need for process methodology for crosslinked polymeric materials and particles thereof wherein the crosslink structural elements are generated in situ and de novo.

Processes for the preparation of the aforementioned polymeric materials are enabled, in embodiments of the present invention, by for example, heating a mixture comprising a free radical initiator compound, at least one stable free radical compound, at least one free radical polymerizable monomer, and at least one free radical polymerizable crosslinking compound; and cooling the mixture, wherein the resulting product is crosslinked resin particles comprised of polymerized monomers and crosslinking compounds, wherein the resin has a high functional group content and is prepared in situ in one step.

The polymer resin particulate compositions of the present invention may be formed into a variety of products, for example by known processes such as injection and blow molding processes. Examples of such products include: synthetic catalysts having both chemical and physical properties which enhance the specificity of the catalyst and the reaction rate, such as, the presence of certain functional groups, pore size, surface area, and the like; resins for electrostatographic toner and developer compositions; polymeric materials for applications including, but not limited to, adhesive formulations, surfactants and viscosity modifiers; and monomodal or multimodal resins for use in films and coating technologies.

The polymerization processes and the resultant crosslinked compounds, resins or elastomer particle products of the present invention are useful in many applications, for example, as a variety of specialty applications including toner and liquid immersion development ink resins or ink additives used for electrophotographic imaging processes, and including ink jet ink formulations, or in combination with mixtures of monomodal narrow molecular weight resins or block copolymers which are suitable, for example, in films, electrophotographic marking materials such as toners and toner additives, and aqueous or organic solvent borne coating technologies.

The above and other problems have been unexpectedly solved in embodiments of the present invention wherein there are provided superior results arising from copolymerizing, for example by heating, with an initiator compound, at least one stable free radical compound, at least one free radical polymerizable monomer, and at least one free radical reactive crosslinking agent or monomer to form a crosslinked polymeric product containing crosslinked structural elements which are substantially of the same length, and as illustrated herein.

SUMMARY OF THE INVENTION

It is an object, in embodiments, of the present invention to overcome deficiencies of prior art preparative polymerization processes for crosslinked and the like polymeric structures, and to provide polymerization processes with improved efficiency, improved flexibility, and improved operational economies.

Another object of the present invention, in embodiments, is to provide improved polymerization processes for the preparation of resins which comprise: heating a mixture comprising a free radical initiator compound, at least one stable free radical compound, at least one free radical polymerizable monomer, and at least one free radical polymerizable crosslinking compound; and cooling the mixture, wherein the resulting product is crosslinked resin particles comprised of polymerized monomers and crosslinking compounds, wherein the particles have a narrow particle size distribution and a narrow pore size distribution, and a high monomer to polymer conversion.

In another object of the present invention, in embodiments, there is provided polymerization and particle forming processes wherein control of the polymerization reaction time at a given temperature affords an ability to control the resulting volume average particle size and particle size distribution. For example, in embodiments, exemplary polymerizations provided particle sizes ranging from about 50 nanometers to about 1 micrometer. The particle size can be controlled by both the reaction time and the amount of the crosslinker used. Generally, the longer the reaction time and the higher the crosslink density, the larger the particle size.

Yet another object of the present invention, in embodiments, is provided by polymerization and particle forming processes wherein control of the molar ratio of the crosslinking compound to the polymerization monomer affords an ability to control the pore size and pore size distributions of resulting resin particles. Thus, where a typical crosslinking polymerization mixture of the present invention is heated from about 1 hours to about 10 hours there results resin particle sizes of from about 1 nanometer to about 5 micrometers and the particle size distribution is from about 1.1 to about 2 GSD.

In an exemplary polymerization process of the present invention, when the crosslinking compound is divinyl benzene and is in an initial molar ratio with respect to the polymerizable monomer of about 0.1 to about 100, the resulting product particles possess a nominal pore size distribution of from about 50 nanometers to about 500 nanometers.

In yet another object of the present invention, in embodiments, there is provided polymerization and particle forming processes wherein selection of an appropriate mixture or ratio of an ionizable polymerizable monomer, and a nonionizable polymerizable monomer, there results a crosslinked polymeric product with a ionic group, for example, a sulfonate bulk and/or surface density which is approximately proportional to the initial ratio selected. Thus, when in a mole ratio of from about 100:0 to about 1:99, and a divinyl benzene compound as the crosslinking compound in a mole ratio of from about 0.01:1.0 to about 0.75:1.0 with respect to the polymerizable monomers, there results a crosslinked polymeric product with a sulfonate bulk and surface density of from about 99.99 mole percent to about 0.99 mole percent.

An object of the present invention, in embodiments, is to provide stable free radical agent moderated, or alternatively, mediated polymerization processes or pseudoliving polymerization processes and crosslinked polymer products therefrom that overcome many of the problems and disadvantages of the aforementioned prior art.

In another object of the present invention, in embodiments, there is provided stable free radical moderated polymerization processes for the preparation of crosslinked thermoplastic or thermoset resins, elastomers, and if desired surface functionalized particles thereof.

It is also an object of the present invention, in embodiments, to provide polymerization processes for the production of crosslinked diblock and multiblock polymers with high monomer to polymer conversion, and controlled or uniform crosslink density.

It is a further object of the present invention, in embodiments, to provide polymerization processes which, if desired, avoid the use of water or organic solvents, or chain transfer agents as a means of controlling the molecular weight of the resulting polymers.

Another object of the present invention, in embodiments, is to provide polymerization reaction systems which may be conducted in the presence of a minimum amount of conventional reaction media such as water and mixtures of water and water miscible organic solvents.

In another object of the present invention, in embodiments, there is provided polymerization and particle forming processes which enable the formation of polymeric products with well defined particle and pore properties using stable free radical mediated polymerization. Although not wanting to be limited by theory, it is believed that the use of the crosslinking agent unexpectedly provides superior polymerization and particle forming results compared to aforementioned commonly owned and assigned stable free radical mediated polymerization processes. The use of the crosslinking compound in a stable free radical polymerization process of the present invention appears to behave as both a monomer for the purpose of propagating the main polymer chain or chains, and also functions as a crosslinking compound to afford particles of controlled particle size and provides wide latitude of introducing various functional groups into the crosslinked resin particle product.

Other minor additives which can have markedly beneficial effects on stable free radical mediated polymerization processes and on the crosslinking processes of the present invention include, for example, addition of dialkyl sulfoxide promoter compounds, such as dimethyl sulfoxide (DMSO), reference commonly assigned U.S. Pat. No. 5,322,912, organic sulfonic acid ammonium salt compounds, reference the aforementioned copending application U.S. Ser. No. 08/413,663 (D/95113), and charge transfer compounds, reference the aforementioned copending U.S. Ser. No. 08/553, 200 (D/95421), U.S. Pat. No. 5,739,229 the disclosures of which are incorporated by reference herein in there entirety.

Still another object of the present invention, in embodiments, is to prepare water soluble crosslinked resins or elastomers by single pot processes employing suitable water soluble monomer, monomers, or unsaturated polymers, free radical initiators, stable free radical compounds, crosslinking agents, and optional minimal amounts of an emulsifier or surfactant which may provide rate enhancement or simplify isolation, but principally avoids emulsification or phase separation during the polymerization.

A further object of the present invention provides, in embodiments, crosslinked polymers wherein the polymers are prepared by a stable free radical mediated polymerization or addition processes wherein precise control over the length of the oligomer or polymeric arms or side chains is maintained throughout the process. This control provides substantial advantages in application areas of, for example, particle size distribution, pore size, ion exchangeable functional group density, ion exchange capacity, viscosity modification, matrix strengthening, and resin clarity improvement, since these properties depend to a substantial extent on the tertiary structure of the resulting crosslinked polymer, and which tertiary structure can be controlled and therefore well defined in embodiments of the present invention.

Other objects of this invention will be apparent to those skilled in the art in light of the present disclosure and appended claims.

DETAILED DESCRIPTION OF THE INVENTION

The free radical polymerization process of the present invention may be used to prepare a variety of crosslinked polymeric materials with well defined and controllable, particle size, particle size distribution, pore size, pore size distribution, and functional group bulk or surface density or distribution.

A "crosslinking compound or agent" or "crosslinker" as used herein refer to those compounds which are capable of forming a crosslink between two polymeric chain segments. The crosslink can, in embodiments, occur or be formed on a single polymer chain but predominantly occurs between two or more different polymeric chains. A "crosslink" refers, in embodiments, to the corresponding polymeric structural element resulting polymerization of one or more of the aforementioned crosslinking agents or compounds. In embodiments of the present invention, a crosslinking agent is capable of producing a crosslink and enables one or more polymer chains to be covalently attached, bridged, or linked. An exemplary free is radical polymerizable crosslinking compound contains at least two non adjacent free radical polymerizable double bonds.

Suitable crosslinking agents can be, but are not limited to the general formula $$CR^1_2=CR^1-R-CR^1=CR^1_2$$

wherein the crosslinking compounds contains at least two unconjugated free radical polymerizable double bonds, R is a group which separates the two double bonds and can contain such groups as alkyl, alkylene, alkylaryl, and cycloalkyl substituents with from 1 to about 25 carbon atoms, and combinations with various suitable heteroatoms including oxygen, nitrogen, sulfur, phosphorous, and the like atoms, and $R^1$ groups are independently selected from hydrogen, and carbon containing substituents with from 1 to about 25 carbon atoms.

Suitable free radical polymerizable crosslinking compound include but not limited to vinylstyryl compounds, divinylstyryl compounds, divinylacrylate compounds, divinyl alkylacrylate compounds, divinylacrylamide compounds, di (N-vinyl) compounds, unconjugated diene compounds, unconjugated diallyl compounds, and mixtures thereof. In embodiments, a preferred crosslinking compound is divinyl benzene. In embodiments, from 1 to about 10 crosslinking compounds selected. In other embodiments, from 2 to 10 crosslinkingcompounds selected, for example, when particle having graduated, that is for example, large outer pore sizes going to progressively smaller pore sizes as the center of the particle is approached.

In embodiments of the present invention, the crosslinking compound can be added to the polymerization reaction mixture prior to heating with the other polymerization reactants. In other embodiments, the crosslinking agent is added to the reaction mixture only after a period of time has elapsed where the initial polymerization reaction mixture, in the absence of the crosslinking agent, has been heated, and wherein, generally lower crosslinking densities and larger pore sizes can be achieved. In still other embodiments of the present invention, the crosslinking agent can be added to the heated reaction mixture in regular or variable increments and in various amounts wherein a crosslinked polymer with intermediate, with respect to the abovementioned addition schemes, particle pore properties and particle sizes result.

In still other embodiments, by accomplishing a polymerization reaction using progressively less crosslinking agent, it is possible to obtain particles with gradient pore sizes wherein, for example, the surface or external pores sizes of the particle are relatively large and the pore sizes become progressively smaller as the center of the particle is approached. Particulate pore properties prepared in this manner can be particularly effective and selective as catalyst materials and molecular sieve materials.

In embodiments, the present invention provides efficient and easily controlled processes for preparing thermoplastic or thermoset resins and particulates thereof comprising: heating a mixture comprising a free radical initiator compound, at least one a stable free radical compound, at least one free radical polymerizable monomer, and at least one free radical polymerizable crosslinking compound; and cooling the mixture, wherein the resulting product is comprised of crosslinked thermoplastic or thermoset resin particles, wherein the degree or extent of crosslinking is apparently dependent upon the amount of crosslinking agent used and the extent to which the crosslinking reaction is completed, comprised of polymerized monomers and crosslinking compounds, wherein the particles can have a narrow pore size distribution, if desired. Although not wanting to be limited by theory, apparent controlling factors for particle size are: the crosslinker mole percent relative to the other reactive components; the reaction time; and the initiator concentration. The lower the crosslinker mole percent or the longer the reaction time, the larger the resulting particle size. The higher the free radical initiator concentration the smaller the resulting particle size. The higher the crosslinker mole percent, the smaller the average pore size.

The above simultaneous and sequential polymerization and crosslinking processes can be repeated one or more times, with or without the cooling step between subsequent addition of additional reactants. Thus, the cooling is optional with the exception of when it is desired to isolate a stable polymer In an exemplary embodiments, there can be selected as starting materials for use in processes of the present invention, a styrene sulfonate compound, such as a sodium salt, as the ionizable polymerizable monomer and a styrene compound as the nonionizable polymerizable monomer, and divinyl benzene as the crosslinking compound, and wherein there results a crosslinked polymeric particulate product with a sulfonate bulk and surface density which substantially proportional to the amount of styrene sulfonate employed.

In the aforementioned copending U.S. Ser. No. 08/553, 200 (D/95421), there is disclosed stable free radical mediated polymerization processes which employ electron acceptor and electron donor compounds to enhance the rate of the polymerization process, the disclosure of which is incorporated herein by reference. There is also disclosed therein the use of crosslinking compounds, such as divinyl benzene, in conjunction with the other reactants, although no mention is made of control of particle size, pore size, or ion exchange properties of the product particles.

In embodiments of the present invention, there are provided processes for preparing high capacity and high efficiency ion exchange materials, which are believed to be enabled by the present process by way of the ability to selectively introduce high concentrations of ionic functionality into the polymer during polymer chain formation. Ion exchange capacities of from 5 to 95 percent are believed to readily attainable and as illustrated herein.

In embodiments, resin particulate pore sizes can range on average from about 10 nanometers for low crosslinker mole ratio situations to from about 1,000 nanometers for high crosslinker mole ratio situations.

In embodiments of the present invention, a single crosslinking compound or from 2 to about 10 free crosslinking compounds can be included in the reaction mixture prior to heating or added sequentially during the course of the heating of the polymerization reaction mixture, for example, in the preparation of crosslinked polymers which can be structurally and or physically differentiated by the crosslinking compounds selected and the time sequence used for the addition of different crosslinking compounds to the polymerization mixture. In other embodiments, the crosslinker can be added after substantially all the monomer has been consumed in the normal course of a stable free radical agent mediated polymerization step. Thus, the type of crosslinker compound selected and the crosslinker addition time sequence executed can be used to markedly influence and control structural aspects of the polymer and the product particles, and provide readily identifiable structural components and a distinctive indication of when those structural components were formed in the polymerization sequence.

In other embodiments of the present invention, highly crosslinked polymer products with very small and uniform pore size and size distribution can be obtained by employing large amounts of crosslinking compound relative to the free radical polymerizable monomer, and although not wanting to be limited by theory it appears that as the monomer concentration decreases relative to the crosslinker compound concentration, the aforementioned pore size and pore size distribution relation becomes increasingly smaller.

Polymerizable monomers suitable for use in the present invention, in embodiments, include any free radical reactive unsaturated compounds such as styrene compounds; unsaturated hydrocarbon compounds; conjugated diene compounds; acrylate esters and alkyl acrylate esters with from 5 to 25 carbon atoms; N-vinyl acetates; amine, carboxyl, aldehyde, alkyl, cyano, and hydroxyl substituted acrylic acids and acrylic acid esters having from 2 to about 20 carbon atoms; acrylamide; methacrylamide; acrylic acid; methacrylic acid; acrolein; dimethylaminoacrylate; hydroxy alkyl, and amino alkyl acrylates of the formula CH2=C(—R1)—(C=Z)—R2 where R1 is hydrogen, R2 is selected from the group consisting of —OR$_1$ and —NR$_1$R$_2$ where R$_1$ and R$_2$ have from 1 to about 10 carbon atoms, and where Z is selected from the group consisting of oxygen and sulfur atoms; and mixtures thereof. In embodiments, from 1 to about 10 different free radical polymerizable monomers can be selected and simultaneously polymerized in any given monomer addition polymerization step. In other embodiments of the present invention, a single monomer or from 2 to about 10 free radical polymerizable monomers can be included in the reaction mixture prior to heating or added sequentially during the course of the heating of the polymerization reaction mixture, for example, in the preparation of block or multiblock copolymers.

The heating is accomplished in from about 30 minutes to about 60 hours at a temperature of from about 70 to about 175° C.

The cooling of the polymerization mixture is accomplished below about 100° C., preferably below about 80° C, and more preferably below about 40° C. to about 60° C. temporarily or permanently suspend the monomer addition polymerization process.

The monomer to polymer conversion is generally from about 10 to about 100 percent.

In embodiments of the present invention, it is envisioned that the resulting crosslinked resin particles can be combined with at least one additional additive or formulation component, such as a colorant, a magnetic component, a charge control additive, a surfactant, an emulsifier, and a pigment dispersant, a second non crosslinked resin, to form a mixture, and wherein the mixture is melt blended to form a mixture suitable for use as a toner. The combination with other additives can be accomplished prior to, during, or subsequent to the heating step. In embodiments, the resulting crosslinked resin particles can be combined with, for example, an inorganic element, an inorganic oxide compound, and mixtures thereof for the purpose of preparing filled resins which are useful as, for example, magnetic toners.

In other embodiments of the present invention, it is envisioned that the initial reaction mixture can be combined at least one other additive or formulation component, such as a colorant, a charge control additive, a surfactant, an emulsifier, a pigment dispersant, and mixtures thereof, prior to heating, to form a second mixture comprised of particles suitable for use as a toner when the mixture is subsequently polymerized with heating, irradiation, and equivalent means for effecting stable free radical mediated type polymerizations.

In other embodiments of the present, it is possible to copolymerize mixtures of mono- and or difunctional free radical reactive monomers, such as olefins and conjugated dienes, and crosslinking compounds with mono- or multifunctional branching agent monomers to produce various crosslinked and branched copolymer architectures or copolymeric segments structures which contain both monomer types. Some advantages of the aforedescribed process variant include the ability to prepare highly crosslinked and branched copolymeric materials, and the ability to eliminate additional, separate, or unnecessary polymerization, crosslinking, and chain branching steps.

In embodiments of the present invention, the monomer to polymer conversions typically range of from about 10 to about 100 percent depending upon polymerization/crosslinking conditions selected; the extent to which the steps in the crosslinking are completed; and the number of times the concurrent polymerization and crosslinking sequence is successively repeated.

The processes can be operated as batch, semi-continuous or continuous processes. The processes can be carried out in solution, bulk, suspension, emulsion, phase transfer, and extrusion reaction conditions. The processes of the present invention provide from about 1 to about 99 percent by weight of the reaction mixture prior to polymerization and crosslinking to be a free radical reactive monomer or monomer mixtures. The processes produce polymer products which have operator selectable low, intermediate, or high molecular weight; well defined crosslinking properties; low residual salt content or are salt free; posses thermal and acidic stability; and low toxicity; if desired.

In embodiments, the present invention overcomes many of the problems and disadvantages of the aforementioned related art crosslinking polymerization processes by forming in situ, high functional group content crosslinked polymeric resins and wherein high conversion from monomer to polymer is achieved, for example, as illustrated herein.

The stable free radical agent, in embodiments of the present invention, is comprised of a compound with a sterically hindered atom bearing a stable free radical, selected from the group consisting of sterically hindered nitroxyl compounds, organic hydrazyls, organic verdazyls, pyridinyl compounds, organic aroxyls, aryl alkyls and aryl cycloalkyls in which the unpaired electron is on a carbon atom in the alkyl or cycloalkyl group, and compatible mixtures thereof, and wherein the stable free radical agent is thermally stable, that is the compound itself does not decompose to any extent under the conditions of the present process, and does not react to any appreciable extent with conventional free radical initiator compounds, such as benzoyl peroxide and peroxy radical species derived therefrom upon thermal or photochemical dissociation of the peroxide.

The stable free radical compound when covalently bound to the polymer product preferably has no unpaired electrons, that is, has no free radical character or free unpaired electrons.

Suitable stable free radical compounds for use in the present are known, and can be prepared prior to mixing with the other polymerization reactants or they may be generated in situ or on an as needed basis, reference for example, the aforementioned copending application U.S. Ser. No. 08/345, 371 (D/94743), wherein a hindered secondary amine is converted in situ into a nitroxyl compound prior to stable free radical polymerization, and the non-nitroxyl type stable free radical compounds described in "Free Radicals" Volumes I and II, edited by J. K. Kochi, Wiley-Interscience, New York, 1973, and in the aforementioned copending U.S. Pat. No. 5,530,079.

The stable free radical agent compounds of the present invention may be generated in any suitable fashion from the corresponding non-free radical precursor, for example, thermally, chemical, electrochemically, photolytically, mechanically, and the like methods.

Examples of suitable and preferred stable free radicals are disclosed in the aforementioned U.S. Pat. No. 3,600,169 to Lawton.

The monomer or monomers to be polymerized in embodiments can be is dissolved in water or aqueous mixtures of polar protic or aprotic organic solvents. The resultant aqueous solution usually contains a suitable water-soluble, free-radical generating initiator such as a peroxide or a persulfate, and the like, as defined herein. The monomer or monomers are used in effective amounts relative to the free radical initiator, and stable free radical agent, as defined hereinafter.

Suitable initiators for the polymerization processes of the present invention are any conventional free radical initiators which have a half-life of at least 1 second at the polymerization temperature. Preferably, the initiator will have a half life of from about 10 second to about 2 hours, more preferably from about 10 seconds to about 10 minutes at the polymerization reaction temperature. These initiators include, but are not limited to oxygen, hydrogen peroxide, certain alkyl hydroperoxides, dialkyl peroxides, peresters, percarbonates, peroxides, persulfates and azo initiators. Specific examples of some suitable initiators include hydrogen peroxide, t-butyl hydroperoxide, di-tertiary butyl peroxide, tertiary-amyl hydroperoxide, potassium persulfate, dibenzoyl peroxide, and methylethyl ketone peroxide. The initiators are normally used in amounts of from about 0.05 percent to about 33 percent based on the weight of total polymerizable monomer. A preferred range is from about 0.5 to about 20 percent by weight of the total polymerizable monomer. In embodiments, the molar ratio of monomer to stable free radical agent to free radical initiator compounds is from about 50:0.2:1.0 to about 20,000:2.5:1.0. Preferred free radical initiators do not react with or degrade the stable free radical compounds with the exception of the aforementioned in situ stable free radical generation resulting from the reaction of the stable free radical precursor compound with a free radical fragment species.

The free radical initiator can be any free radical polymerization initiator capable of initiating a free radical polymerization process of unsaturated monomers and includes peroxide initiators such as benzoyl peroxide, persulfate initiators such as potassium persulfate, azo initiators such as azobisisobutyronitrile, and the like. The initiator concentration employed is, for example, about 0.2 to about 16.0 weight percent of the total weight of monomer to be polymerized and is determined by the desired molecular weight of the resin. As the initiator concentration is decreased relative to the weight or molar equivalents of monomer used, the molecular weight of the resin or elastomer product increases.

Water soluble free radical initiators can be optionally employed in the processes of this invention and are those that are traditionally used in aqueous polymerization. Examples of water soluble free radical initiators are: persulfates; water soluble peroxides and hydroperoxides; more specifically, sodium, potassium and ammonium persulfate; peroxides such as hydrogen peroxide, t-butyl hydroperoxide, cumene hydroperoxide, para-menthane hydroperoxide; and peroxy carbonates. Other water soluble initiators of similar decomposition mechanism may be used if desired.

The free radical initiator compounds selected must satisfy certain maximum half-life requirements for the purpose of providing efficient and highly controlled polymer chain initiation. The stable free radical agent compounds selected must satisfy certain stability requirements including high thermal stability, and high resistance to degradation by acids or photochemical means. The stable free radical compounds must not initiate nor excessively inhibit or retard the desired polymerization processes. The stable free radical agent compounds selected must also satisfy certain bond energy and steric hindrance requirements when the stable free radical agent compound is attached to the end of the propagating polymer chain, reference for example, the aforementioned commonly owned U.S. Pat. No. 5,530,079.

In other embodiments, the polymerization processes of the present invention can be used to prepare crosslinked block copolymers and multi-block polymers, wherein at least one of the blocks is optionally water soluble thereby providing, for example, a method for preparing crosslinked or networked surface active agents, surfactant materials, and highly surface active particles, having well defined critical micelle concentration (CMC) and hydrophobe-lipophobe balance (HLB) properties.

The present invention describes crosslinked polymers and particles prepared by a stable free radical mediated free radical polymerization process in which control over the primary polymer chain lengths can be exercised if desired. This control provides substantial advantages in various applications such as viscosity modification, matrix strengthening and resin clarity improvement, since these properties depend to a substantial extent on the tertiary structure of the crosslinked polymer.

The present invention provides crosslinked polymer products with a latent thermally reactive or latent functional group on at least one end or terminus of the crosslinked polymer and which latent functional group can be used for further reaction with for example, a free radical reactive small or large molecule for the purpose of isolating and fixing the molecule to, for example, a polymeric matrix.

The polymerization reactions of the present invention can be supplemented with a solvent or cosolvent if desired to help ensure that the reaction mixture or at least the monomer containing portion remains a homogeneous single phase throughout the monomer conversion. Any solvent or cosolvent may be selected so long as the solvent media is effective in providing a solvent system which avoids precipitation or phase separation of the reactants or polymer products until after all the solution polymerization reactions have been completed. Exemplary solvent or cosolvents useful in the present invention may be selected from the group consisting of polymer product compatible aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl CARBITOL® or CELLOSOLVE®, amino alcohols, ketones, and the like, derivatives thereof, and mixtures thereof. Specific examples include ethylene glycol, propylene glycol, diethylene glycol, glycerine, dipropylene glycol, tetrahydrofuran, and the like, and mixtures thereof. When mixtures of water and water soluble or miscible organic liquids are selected as the reaction media, the water to cosolvent weight ratio typically ranges from about 100:0 to about 10:90, and preferably from about 97:3 to about 25:75.

The present invention provides several specific advantages in embodiments as follows.

The polymerization reaction rate of the monomers may, in embodiments, be inhibited or accelerated and the reaction time influenced by the addition of minor amounts of a protic acid selected from the group consisting of inorganic acids, such as sulfuric, hydrochloric, and the like, and organic sulfonic and carboxylic acids. Although a definitive trend is presently not well defined, the added acid may have a profound or very little effect on the polymerization rate, depending upon a variety of reaction variables and conditions. Excessive addition of inorganic and organic acid beyond equimolar amounts compared to the stable free radical agent causes the polydispersity of the primary polymer chain to broaden. In embodiments, the protic acid source may be in the form of an effective acid functional group such as carboxylic, sulfonic, phosphonic, and the like groups, contained in either the stable free radical agent or in the free radical initiator compound.

Alternatively, crosslinked block copolymer resins may also be prepared whereby after each desired block has been formed a new monomer or monomers is added, without the addition of more initiator or stable free radical agent, to form a new block wherein each block component is well defined in length and has a narrow molecular weight distribution and having properties depending on the repeated sequence and the monomers chosen for incorporation. Monomers added subsequent to the formation of the first formed crosslinked resin or elastomer may be water soluble or water insoluble. Judicious selection of the water solubility properties of added monomers and the resulting polymeric segment enables convenient synthetic routes to crosslinked block and multiblock copolymers having primary structures or polymer chains with narrow polydispersities that are useful, for example, as surfactants, resin compatibilizers, such as "molecular velcro", geometrically well defined polymeric resin particles which are readily and highly dispersible in water or aqueous vehicles, viscosity modifiers, emulsifiers, and the like.

Additional optional known additives may be used in the polymerization reactions which do not interfere with the objects of the invention and which may provide additional performance enhancements to the resulting crosslinked product, for example, colorants, lubricants, release or transfer agents, surfactants, stabilizers, antifoams, antioxidants, and the like.

Toner compositions can be prepared by a number of known methods, such as admixing and heating resin particles obtained with the processes of the present invention such as divinyl benzene crosslinked terpolymer styrene-styrene sulfonate-butadiene, pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Subsequently, the toner compositions can be classified utilizing, for example, a Donaldson Model B classifier for the purpose of removing toner fines, that is toner particles less than about 4 microns volume median diameter.

Illustrative examples of resins obtained with the invention processes and suitable for toner and developer compositions of the present invention include crosslinked, and mixtures of crosslinked and uncrosslinked polymers, such as styrene acrylates, styrene methacrylates, styrene butadienes, vinyl resins, including homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Preferred toner resins include styrene butadiene copolymers, mixtures thereof, and the like. Other preferred toner resins include styrene/n-butyl acrylate copolymers, PLIOLITES®; suspension polymerized styrene butadienes, reference U.S. Pat. No. 4,558,108, the disclosure of which is totally incorporated herein by reference.

In toner compositions, the resin particles are present in a sufficient but effective amount, for example from about 70 to about 90 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render one toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances, which magnetites are a mixture of iron oxides ($FeO.Fe_2O_3$) including those commercially available as MAPICO BLACK®, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL®, can be surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K. K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are optionally present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight and may in embodiments function as fuser roll release agents.

Encompassed within the scope of the present invention are colored toner and developer compositions comprised of toner resin particles, carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as Cl 60710, Cl Dispersed Red 15, diazo dye identified in the Color Index as Cl 26050, Cl Solvent Red 19, and the like. Illustrative examples of cyan materials that may be used as pigments include copper tetra-4-(octadecyl sulfonamido) phthalocyanine, X-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellow pigments that may be selected are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. Nos. 3,526,533, 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition of the present invention can be prepared by a number of known methods as indicated herein including extrusion melt blending the toner resin particles, pigment particles or colorants, and a charge enhancing additive, followed by mechanical attrition. Other methods include those well known in the art such as spray drying, melt dispersion, emulsion aggregation, and extrusion processing. Also, as indicated herein the toner composition without the charge enhancing additive in the bulk toner can be prepared, followed by the addition of charge additive surface treated colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions are usually jetted and classified subsequent to preparation to enable toner particles with a preferred average diameter of from about 5 to about 25 microns, and more preferably from about 8 to about 12 microns. Also, the toner compositions preferably possess a triboelectric charge of from about 0.1 to about 2 femtocoulombs per micron as determined by the known charge spectrograph. Admix time for toners are preferably from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared from resins of the present invention possess desirable narrow charge distributions, optimal charging triboelectric values, preferably of from 10 to about 40, and more preferably from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of less than 15 seconds, and more preferably in some embodiments from about 1 to about 14 seconds.

The invention will further be illustrated in the following non limiting Examples, it being understood that these Examples are intended to be illustrative only and that the invention is not intended to be limited to the materials, conditions, process parameters, and the like, recited herein. Parts and percentages are by weight unless otherwise indicated.

EXAMPLE 1

Preparation of Crosslinked Poly(styrene sulfonate-sodium salt) 1:1 molar ratio of SS-Na and DVB. To a round bottom flask was added styrenesulfonate-sodium salt (SS-Na, 10 g, 0.0487 mole), divinylbenzene (DVB, 6.34 g, 0.0487 mole), and TEMPO (0.91 g, 0.00583 mole). To this was added ethylene glycol (24 mL) and water (16 mL) and heated to 80° C. Then a redox initiator system, potassium persulfate (0.877 g, 0.00324 mole) and sodium bisulfite (0.44 g), was added. After one half hour, the heterogeneous solution was heated to reflux. After 7 hours, the reaction was cooled and precipitated into a solution of methanol/acetone (220 mL 1:1 ratio). The white powder was isolated and dried to yield 12.2 g (66%) of product.

EXAMPLE II

Preparation of Crosslinked Poly(styrene sulfonate-sodium salt) 1:0.5 molar ratio of SS-Na and DVB. To a round bottom flask was added styrenesulfonate-sodium salt (SS-Na, 10 g, 0.0487 mole), divinylbenzene (DVB, 3.17 g, 0.02435 mole), and TEMPO (0.688 g. 0.00438 mole). To this was added ethylene glycol (24 mL) and water (16 mL) and heated to 80° C. Then a redox initiator system, potassium persulfate (0.656 g, 0.00243 mole) and sodium bisulfite (0.376 g), was added. After one half hour, the heterogeneous solution was heated to reflux. After 7 hours, the reaction was cooled and precipitated into a solution of methanol/acetone (200 mL 1:1 ratio). The white powder was isolated and dried to yield 9.2 g (62%) of product.

EXAMPLE III

Preparation of Crosslinked Poly(styrene sulfonate-sodium salt) 1:0.33 molar ratio of SS-Na and DVB. To a round bottom flask was added styrenesulfonate-sodium salt (SS-Na 10 g, 0.0487 mole), divinylbenzene (DVB, 2.1 g, 0.0162 mole) and TEMPO (0.606 g, 0.00389 mole). To this was added ethylene glycol (24 mL) and water (16 mL) and heated to 80° C. A redox initiator system, potassium persulfate (0.584 g, 0.00216 mole) and sodium bisulfite (0.292 g), was added. After 40 minutes, the heterogeneous solution was heated to reflux. After 7 hours, the reaction was cooled and precipitated into a solution of methanol/acetone (200 mL, 1:1 ratio). The white powder was isolated and dried to yield 10.1 g (74%) of product.

EXAMPLE IV

Preparation of Crosslinked Poly(styrene sulfonate-sodium salt) 1:0.16 molar ratio of SS-Na and DVB. To a round bottom flask was added styrenesulfonate-sodium salt (SS-Na, 10 g, 0.0487 mole), divinylbenzene (DVB, 1.05 g, 0.0081 mole), and TEMPO (0.53 g, 0.00341 mole). To this was added ethylene glycol (24 mL) and water (16 mL) and heated to 80° C. Then a redox initiator system, potassium persulfate (0.51 g, 0.00189 mole) and sodium bisulfite (0.25 g), was added. After 40 minutes, the heterogeneous solution was heated to reflux. After 7 hours, the reaction was cooled and precipitated into a solution of methanol/acetone (200 mL, 1:1 ratio). The white powder was isolated and dried to yield 5.0 g (41 %) of product.

The four products from the respective Examples I–IV were particulate powders and were free flowing. The free flowing property suggests that there was no gel formation in the reaction mixtures. The isolated particulate solids were dispersed in water and the particle sizes measured on a NICOMP submicron particle sizer (Model 370) or a Brookhaven Instruments BI-DCP disk centrifuge particle sizer. The particle sizes are reported in volume weighted distribution using the Brookhaven Instruments BI-DCP disk centrifuge particle sizer. The maximum in the particle distribution, that is, maximum particle size occurrence in the particle size distribution is given the column labeled "particle size". The distribution range of particle sizes, from the smallest to largest particle size, is given in the column labeled "Distr. Range".

TABLE 1

| Example | SS-Na:DVB | Particle Size (nm) | Distr. Range |
|---|---|---|---|
| I | 1:1 | 350 | 210 nm-1 micron |
| II | 1:0.5 | 600 | 450 nm-1 micron |
| III | 1:0.33 | 700 | 420 nm-1.4 micron |
| IV | 1:0.16 | 840 | 630 nm-1.5 micron |

EXAMPLE V

Preparation of Crosslinked Copoly(styrene-styrene sulfonate-sodium salt) 1.0:1.0:0.5 molar ratio of St:SS-Na:DVB To a round bottom flask is added styrenesulfonate-sodium salt (SS-Na, 10 g, 0.0487 mole), styrene (5.06g, 0.0487 mole), divinylbenzene (DVB, 3.17 g, 0.02435 mole), and TEMPO (0.53 g, 0.00341 mole). To this is added ethylene glycol (24 mL) and water (16 mL) and heated to 80° C. Then a redox initiator system, potassium persulfate (0.51 g, 0.00189 mole) and sodium bisulfite (0.25 g), is added. After 40 minutes, the heterogeneous solution is heated to reflux. After 7 hours, the reaction is cooled and precipitated into a solution of methanol/acetone (200 mL, 1:1 ratio).

EXAMPLE VI

Preparation of Crosslinked Copoly(butylacrylate-styrene sulfonate-sodium salt) 1.0:0.5 molar ratio of SS-Na:DVB To a round bottom flask is added styrenesulfonate-sodium salt (SS-Na, 10 g, 0.0487 mole), butylacrylate (6.24, 0.0487 mole), divinylbenzene (DVB, 3.17 g, 0.02435 mole), and TEMPO (0.53 g, 0.00341 mole). To this is added ethylene glycol (24 mL) and water (16 mL) and heated to 80° C. Then a redox initiator system, potassium persulfate (0.51 g, 0.00189 mole) and sodium bisulfite (0.25 g), is added. After 40 minutes, the heterogeneous solution is heated to reflux. After 7 hours, the reaction is cooled and precipitated into a solution of methanol/acetone (200 mL, 1:1 ratio).

EXAMPLE VII

Preparation of Crosslinked polystyrene 1.0:0.03 molar ratio of styrene:DVB To a round bottom flask is added styrenes (10 g, 0.096 mole), divinylbenzene (DVB, 0.375 g, 0.00288 mole), and TEMPO (0.53 g, 0.00341 mole). To this is added ethylene glycol (24 mL) and water (16 mL) and heated to 80° C. Then a redox initiator system, potassium persulfate (0.51 g, 0.00189 mole) and sodium bisulfite (0.25 g), is added. After 40 minutes, the heterogeneous solution is heated to reflux. After 7 hours, the reaction is cooled and precipitated into a solution of methanol/acetone (200 mL, 1:1 ratio).

EXAMPLE VIII

Magnetic Toner Preparation and Evaluation The polymer resin (74 weight percent of the total mixture) obtained by the stable free radical polymerization processes in Example I may be melt extruded with 10 weight percent of REGAL 330® carbon black and 16 weight percent of MAPICO BLACK® magnetite at 120° C., and the extrudate pulverized in a Waring blender and jetted to 8 micron number average sized particles. A positively charging magnetic toner may be prepared by surface treating the jetted toner (2 grams) with 0.12 gram of a 1:1 weight ratio of AEROSIL R972® (Degussa) and TP-302 a naphthalene sulfonate and quaternary ammonium salt (Nachem/Hodogaya SI) charge control agent. Other toner additives can be optionally added to adjust the magnitude or sign of the charge on the toner particles as desired, reference for example, U.S. Pat. No. 4,937,157 and references therein, the disclosures of which are incorporated herein by reference in there entirety.

Developer compositions may then be prepared by admixing 3.34 parts by weight of the aforementioned toner composition with 96.66 parts by weight of a carrier comprised of a steel core with a polymer mixture thereover containing 70 percent by weight of KYNAR®, a polyvinylidene fluoride, and 30 percent by weight of polymethyl methacrylate; the coating weight being about 0.9 percent. Cascade development may be used to develop a Xerox Model D photoreceptor using a "negative" target. The light exposure may be set between 5 and 10 seconds and a negative bias used to dark transfer the positive toned images from the photoreceptor to paper.

Fusing evaluations may be carried out with a Xerox Corporation 5028® soft silicone roll fuser, operated at 7.62 cm (3 inches) per second.

The minimum fix and hot offset temperatures of the crosslinked stable free radical mediated polymerization polymers as toners or in admixture with conventional toner resins are expected to be improved over toners resins prepared by conventional free radical polymerization processes. The actual fuser roll temperatures may be determined using an Omega pyrometer and was checked with wax paper indicators. The degree to which a developed toner image adhered to paper after fusing is evaluated using a Scotch® tape test. The fix level is expected to be excellent and comparable to that fix obtained with toner compositions prepared from other methods for preparing toners. Typically greater than 95 percent of the toner image remains fixed to the copy sheet after removing a tape strip as determined by a densitometer. Alternatively, the fix level may be quantitated using the known crease test, reference the aforementioned U.S. Pat. No. 5,312,704.

Images may be developed in a xerographic imaging test fixture with a negatively charged layered imaging member comprised of a supporting substrate of aluminum, a photogenerating layer of trigonal selenium, and a charge transport layer of the aryl amine N,N'-diphenyl-N,N'-bis(3-methylphenyl)1,1'-biphenyl-4,4'-diamine, 45 weight percent, dispersed in 55 weight percent of the polycarbonate MAKROLON®, reference U.S. Pat. No. 4,265,990, the disclosure of which is totally incorporated herein by reference; images for toner compositions prepared from the copolymers derived from for example, Example XI are expected to be of excellent quality with no background deposits and of high resolution over an extended number of imaging cycles exceeding, it is believed, about 75,000 imaging cycles.

Other toner compositions may be readily prepared by conventional means from the crosslinked polymer and copolymer resins of the present invention including colored toners, single component toners, multi-component toners, toners containing special performance additives, and the like.

The crosslinked polymers and copolymers of the present invention find utility in a wide variety of applications such as the improvement of the rheological properties of resins by, for example. blending with conventional polymers, improving the compatibility of polymer blends by adding small amounts of the crosslinked polymers and copolymers as compatilizing agents, particularly those polymers with particles that possess large pore sizes thereby providing interpenetration of a low melt polymer phase therein, improving the viscosity index of lubricating oils, the use of these materials as a dispersant, and improving the impact strength of polyphenylene ether resins. The stable free radical agent moderated homopolymer and copolymer crosslinking polymerization processes of the present invention may be applied to a wide range of organic monomers to provide novel toner resin materials with desirable electrophotographic properties. As an example, crosslinked block copolymers have application as dispersants for photoreceptor pigments. Crosslinked multimodal resins have application to low melt resins and certain monomodal resins may be used to modify the surface of carbon black and pigment particles to make the pigment particles more miscible with a host polymer or dispersing medium. Narrow molecular weight partially crosslinked resins such as poly(n-butyl acrylate) or poly(styrene butadiene) find applications as improved toner resins and toner particles for general application and particularly as "molecular velcro" compounds.

The aforementioned patents and publications are incorporated by reference herein in their entirety.

Other modifications of the present invention may occur to one of ordinary skill in the art based upon a review of the present application and these modifications, including equivalents thereof, are intended to be included within the scope of the present invention.

What is claimed is:

1. A process for the preparation of resin particles comprising:

heating a mixture comprised of a free radical initiator compound, at least one stable free radical compound, at least one free radical polymerizable monomer compound, and at least one free radical polymerizable crosslinking compound;

and cooling the mixture, wherein the resulting product resin particles are crosslinked and are comprised of polymerized monomers and at least one crosslinking compound, and wherein the particles have a narrow particle size distribution of from about 1.1 to about 2 geometric size distribution (GSD), a narrow pore size distribution of from about 10 to about 1,000 nanometers, and a high monomer to polymer conversion of from about 10 to about 100 percent.

2. A process in accordance with claim 1, wherein the heating is from about 1 hours to about 10 hours with the result that the resin particle size ranges from about 1 nanometer to about 5 micrometers.

3. A process in accordance with claim 1, wherein the crosslinking compound is selected in an initial molar ratio with respect to the polymerizable monomer or monomers of about 0.1 to about 100, and wherein the resulting product resin particles possess a nominal pore size distribution of from about 50 nm to about 500 nm.

4. A process in accordance with claim 1, wherein there is selected an ionizable polymerizable monomer and a nonionizable polymerizable monomer in an amount of from about 99:1 to about 1:99 mole percent, and wherein there results a crosslinked polymeric product with an ionic group bulk and surface density which is substantially proportional to the ionizable monomer mole percent present during heating.

5. A process in accordance with claim 4, wherein there is selected a styrene sulfonate compound as the ionizable polymerizable monomer and a nonionizable styrene compound as the nonionizable polymerizable monomer in a mole ratio of from about 100:0 to about 1:99, and a divinyl benzene compound as the crosslinking compound in a mole ratio of from about 0.01:1.0 to about 0.75:1.0 with respect to the polymerizable monomers, and wherein there results a crosslinked polymeric product with a sulfonate bulk and surface density of from about 99.99 mole percent to about 0.99 mole percent.

6. A process in accordance with claim 1, wherein from 2 to about 10 free radical polymerizable monomers are selected.

7. A process in accordance with claim 1, wherein from 2 to about 10 crosslinking compounds are selected.

8. A process in accordance with claim 1, wherein the free radical polymerizable crosslinking compounds selected contains at least two non adjacent free radical polymerizable double bonds.

9. A process in accordance with claim 1, wherein the free radical polymerizable crosslinking compound is selected from the group consisting of vinylstyryl compounds, divinylstyryl compounds, divinylacrylate compounds, divinyl alkylacrylate compounds, divinylacrylamide compounds, di(N-vinyl) compounds, unconjugated diene compounds, unconjugated diallyl compounds, and mixtures thereof.

10. A process in accordance with claim 1, wherein the crosslinking compound is divinyl benzene.

11. A process in accordance with claim 1, wherein the free radical initiator compound is selected from the group consisting of peroxide compounds, azo compounds, persulfates compounds, and mixtures thereof.

12. A process in accordance with claim 1, wherein the stable free radical compound is selected from the group consisting of sterically hindered nitroxyl compounds, organic hydrazyls, organic verdazyls, pyridinyl compounds, organic aroxyls, aryl alkyls and aryl cycloalkyls in which the unpaired electron is on a carbon atom in the alkyl or cycloalkyl group, and mixtures thereof.

13. A process in accordance with claim 1, wherein the cooling of the polymerization mixture is accomplished below about 80° C.

14. A process in accordance with claim 1 wherein the free radical polymerizable monomer is a reactive unsaturated compound selected from the group consisting of styrene compounds, unsaturated hydrocarbon compounds, conjugated diene compounds, acrylate esters and alkyl acrylate esters with from 5 to 25 carbon atoms, N-vinyl acetates, amine, carboxyl, aldehyde, alkyl, cyano, and hydroxyl substituted acrylic acids and acrylic acid esters having from 2 to about 20 carbon atoms; acrylamide; methacrylamide; acrylic acid; methacrylic acid; acrolein; dimethylaminoacrylate; hydroxy alkyl, and amino alkyl acrylates of the formula $CH_2=C(-R1)-(C=Z)-R2$ where R1 is hydrogen, R2 is selected from the group consisting of $-OR_1$ and $-NR_1R_2$ where $R_1$ and $R_2$ have from 1 to about 10 carbon atoms, and where Z is selected from the group consisting of oxygen and sulfur atoms; and mixtures thereof.

15. A process in accordance with claim 1 wherein the heating is accomplished in from about 30 minutes to about 60 hours at a temperature of from about 70 to about 175° C.

16. A process in accordance with claim 1, further comprising combining with the mixture prior to or during heating, at least one member selected from the group consisting of a colorant, a magnetic component, a charge control additive, a surfactant, an emulsifier, a pigment dispersant, and mixtures thereof, to form a second mixture comprised of particles suitable for use as a toner.

17. A process in accordance with claim 1, further comprising combining the resulting crosslinked resin particles with at least one member selected from the group consisting of a colorant, a magnetic component, a charge control additive, a surfactant, an emulsifier, a pigment dispersant, and mixtures thereof, to form a mixture, and wherein the mixture is melt blended to form a toner.

18. A process in accordance with claim 1, wherein the resulting crosslinked resin particles are ion exchange active materials with an ion exchange capacity of from about 5 to about 95 percent.

19. A process in accordance with claim 1, further comprising combining the resulting crosslinked resin particles with at least one member selected from the group consisting of an inorganic element, an inorganic oxide compound, and mixtures thereof.

* * * * *